(12) United States Patent
Ko et al.

(10) Patent No.: US 8,144,249 B2
(45) Date of Patent: Mar. 27, 2012

(54) MULTI-SLICING HORIZONTAL SYNCHRONIZATION SIGNAL GENERATING APPARATUS AND METHOD

(75) Inventors: Cheng Ting Ko, Hsinchu Hsien (TW); Chung Hsiung Lee, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 778 days.

(21) Appl. No.: 12/256,751

(22) Filed: Oct. 23, 2008

(65) Prior Publication Data

US 2009/0135301 A1   May 28, 2009

(30) Foreign Application Priority Data

Nov. 23, 2007 (TW) ................................ 96144379 A

(51) Int. Cl.
*H04N 5/05* (2006.01)

(52) U.S. Cl. ........ 348/524; 348/521; 348/525; 348/526; 331/44; 331/45; 331/46; 331/47; 331/48; 375/286; 375/287; 375/288; 375/289; 375/290; 327/3

(58) Field of Classification Search .................. 348/521, 348/524, 525, 526; 331/44–56; 375/286–294; 327/3

See application file for complete search history.

(56) References Cited

U.S. PATENT DOCUMENTS

| | | | | |
|---|---|---|---|---|
| 4,431,993 A * | 2/1984 | Van Der Mark | ................. | 342/91 |
| 4,467,359 A * | 8/1984 | Hosoya | .......................... | 348/541 |
| 5,125,028 A * | 6/1992 | Naito | ............................ | 380/223 |
| 5,680,380 A * | 10/1997 | Taguchi et al. | ............. | 369/47.35 |
| 5,686,968 A * | 11/1997 | Ujiie et al. | ..................... | 348/521 |
| 5,790,200 A * | 8/1998 | Tsujimoto et al. | ............ | 348/545 |
| 5,909,474 A * | 6/1999 | Yoshizawa | ..................... | 375/376 |
| 5,912,713 A * | 6/1999 | Tsunoda et al. | ............... | 348/540 |
| 5,933,196 A * | 8/1999 | Hatano et al. | ................ | 348/441 |
| 6,028,642 A * | 2/2000 | Rinaldi et al. | ................ | 348/540 |
| 6,087,788 A * | 7/2000 | Kawasumi | ..................... | 315/364 |
| 6,104,222 A * | 8/2000 | Embree | ......................... | 327/156 |
| 6,275,553 B1 * | 8/2001 | Esaki | ............................. | 375/371 |
| 6,281,934 B1 * | 8/2001 | Nakatani | ....................... | 348/465 |
| 6,307,594 B1 * | 10/2001 | Yamauchi | ..................... | 348/512 |
| 6,538,648 B1 * | 3/2003 | Koike et al. | .................... | 345/213 |
| 6,628,345 B1 * | 9/2003 | Tachibana et al. | ............ | 348/735 |
| 6,999,132 B1 * | 2/2006 | Adams et al. | ................. | 348/731 |
| 7,050,111 B2 * | 5/2006 | Coste | ............................ | 348/531 |
| 7,327,400 B1 * | 2/2008 | Greenberg | .................... | 348/536 |
| 7,382,413 B2 * | 6/2008 | Cha | ............................... | 348/524 |
| RE40,779 E * | 6/2009 | Oshima et al. | ................ | 375/261 |
| 7,548,121 B2 * | 6/2009 | Wang et al. | ..................... | 331/11 |
| 7,679,453 B2 * | 3/2010 | Min | .............................. | 331/1 A |

(Continued)

*Primary Examiner* — Jefferey Harold
*Assistant Examiner* — Sam Huang
(74) *Attorney, Agent, or Firm* — WPAT., P.C.; Justin King

(57) ABSTRACT

A multi-slicing horizontal synchronization signal generating apparatus and method is provided. The apparatus includes a slicer, a numerically controlled oscillator (NCO), a first phase detector, a second phase detector and a calibration circuit. The slicer performs edge detection on a video signal having a first horizontal synchronization, and generates a first detection signal and a second detection signal according to a first voltage level and a second voltage level, respectively. The NCO generates a second horizontal synchronization signal. The first phase detector detects a first phase difference between the first detection signal and the second horizontal synchronization signal, and the second detector detects the second phase difference between the second detection signal and a reference time point. The calibration circuit generates a calibration signal according to the first phase difference and the second phase difference. The NCO adaptively adjusts the phase of the second horizontal synchronization signal according to the calibration signal.

17 Claims, 9 Drawing Sheets

U.S. PATENT DOCUMENTS

| | | | |
|---|---|---|---|
| 7,949,075 B2 * | 5/2011 | Brunsch et al. | 375/340 |
| 2002/0047924 A1 * | 4/2002 | Huang | 348/549 |
| 2002/0051508 A1 * | 5/2002 | Tachimori | 375/376 |
| 2002/0090045 A1 * | 7/2002 | Hendrickson | 375/376 |
| 2005/0046603 A1 * | 3/2005 | Chang et al. | 341/155 |
| 2005/0174487 A1 * | 8/2005 | O'Connell | 348/525 |
| 2005/0212962 A1 * | 9/2005 | Matsuo et al. | 348/465 |
| 2006/0055468 A1 * | 3/2006 | Hallivuori et al. | 331/16 |
| 2006/0152626 A1 * | 7/2006 | Heijna | 348/532 |
| 2006/0176089 A1 * | 8/2006 | Yamane et al. | 327/156 |
| 2006/0268170 A1 * | 11/2006 | Suzuki et al. | 348/465 |
| 2006/0280240 A1 * | 12/2006 | Kikugawa et al. | 375/229 |
| 2007/0030352 A1 * | 2/2007 | Huang et al. | 348/194 |
| 2007/0035348 A1 * | 2/2007 | Self | 331/16 |
| 2007/0040940 A1 * | 2/2007 | Wang et al. | 348/536 |
| 2007/0058768 A1 * | 3/2007 | Werner | 375/376 |
| 2007/0064999 A1 * | 3/2007 | Kaneda et al. | 382/152 |
| 2007/0109030 A1 * | 5/2007 | Park | 327/156 |
| 2007/0132851 A1 * | 6/2007 | Nash | 348/194 |
| 2007/0182850 A1 * | 8/2007 | Chon et al. | 348/521 |
| 2007/0241824 A1 * | 10/2007 | Tseng | 331/16 |
| 2007/0248192 A1 * | 10/2007 | Brunsch et al. | 375/340 |
| 2007/0279134 A1 * | 12/2007 | Yamane et al. | 331/25 |
| 2008/0074544 A1 * | 3/2008 | Cappaert et al. | 348/537 |
| 2008/0111634 A1 * | 5/2008 | Min | 331/10 |
| 2008/0303568 A1 * | 12/2008 | Werner et al. | 327/158 |
| 2009/0041170 A1 * | 2/2009 | Chang et al. | 375/355 |
| 2009/0045848 A1 * | 2/2009 | Kiaei et al. | 327/10 |
| 2009/0096439 A1 * | 4/2009 | Hsu et al. | 324/76.52 |
| 2009/0257542 A1 * | 10/2009 | Evans et al. | 375/375 |
| 2010/0182060 A1 * | 7/2010 | Fujino et al. | 327/159 |
| 2011/0012683 A1 * | 1/2011 | Lin | 331/11 |
| 2011/0025389 A1 * | 2/2011 | Ma | 327/158 |

* cited by examiner

MULTI-SLICING HORIZONTAL SYNCHRONIZATION SIGNAL GENERATING APPARATUS AND METHOD

FIELD OF THE INVENTION

The present invention relates to a video clock, and more particularly, to a multi-slicing horizontal synchronization signal generating apparatus and method.

BACKGROUND OF THE INVENTION

A current analog television such as an LCD TV or a plasma TV, in order to display video signals like composite video broadcast signals (CVBS) on a screen, requires horizontal and vertical synchronization signals. FIG. 1 shows the structure for generating horizontal synchronization signals by a prior analog television. A slicer 11 receives a CVBS signal, and produces a pulse signal when the CVBS signal crosses a specific voltage level from high to low to indicate that a horizontal synchronization signal in the CVBS signal is detected. The pulse signal is then forwarded to a phased lock loop (PLL) 10, in which a phase detector 12 detects a phase difference between the pulse signal and a horizontal synchronization signal generated by a numerically controlled oscillator (NCO) 14. Based on the phase difference, a loop filter 13 calibrates the phase of the horizontal synchronization signal generated by the NCO 14.

With reference to FIG. 2 showing a timing diagram of the signals in FIG. 1, an ideal timing point of the pulse signal 11 produced by the slicer 11 is a falling edge of the horizontal synchronization signal in the CVBS signal. The NCO 14 has a counter, which has a counter value thereof incrementing with time. When the counter value reaches a certain upper limit, the counter resets the counter value to zero to repeat the incrementing process, as well as to produce a pulse signal for the horizontal synchronization signal. Referring to FIG. 2, the figure shows a phase difference between the horizontal synchronization signal generated by the NCO 14 and the pulse signal produced by the slicer 11. Based on the phase difference, the loop filter 13 calibrates the phase of the NCO 14 in order to eliminate the phase difference.

However, during a transmission process of video signals, a horizontal synchronization signal in a video signal is inevitably distorted due to channel effects, rising to misjudgment of the slicer 11. For example, referring to FIG. 3A, because of distortion of the horizontal synchronization signal in the CVBS signal, the slicer 11 misjudges falling edges thereof to P3 and P4 instead of the ought-have-been P1 and P2. As a result, the phase difference detected by the phase detector 12 gets even larger. At this point, suppose the loop filter 13 calibrates the NCO 14 by a large range, the phase of the horizontal synchronization signal output by the NCO 14 is consequently distorted such that a picture displayed jitters. Therefore, to avoid the picture from jittering, the NCO 14 is only allowed with calibration by a small range with regard to the considerably large phase difference detected by the phase detector 12.

Further, the phase detector 12 may also detect a large phase difference under other circumstances. Referring to FIG. 3B showing changes in the CVBS signal forwarded to the slicer 11 when a television channel is switched, a signal from the original channel not yet completely processed is switched to a signal from the new channel. Nevertheless, the horizontal synchronization signal output from the NCO 14 is unable to correspondingly change right away, and so a quite large phase difference is detected by the phase detector 12. Suppose the NCO 14 calibrates by a small range, a relatively long adjustment period is needed after switching channel for the picture to restore to normal, hence undesirably affecting a user's visual effects.

Conclusive from the foregoing description, the prior structure in FIG. 1 has large phase differences when encountering the two circumstances listed above and as shown in FIGS. 3A and 3B. Jitter is much likely resulted owing to unsatisfactory calibration of the phase of the horizontal synchronization signal.

SUMMARY OF THE INVENTION

Therefore, the object of the invention is to provide a horizontal synchronization signal generating apparatus and method for adaptively determining a phase calibration range of a horizontal synchronization signal.

The invention discloses a multi-slicing horizontal synchronization signal generating device comprising: a slicer, performing edge detection on a video signal having a first horizontal synchronization, so as to generate a first detection signal and a second detection signal according to a first voltage level and a second voltage level, respectively; a numerically controlled oscillator (NCO), for generating a second horizontal synchronization signal; a first phase detector, coupled to the slicer and the NCO, for detecting a first phase difference between the first detection signal and the second horizontal synchronization signal; a second detector, coupled to the slicer and the NCO, for detecting a second phase difference between the second detection signal and a reference time point; and a calibration circuit, coupled to the first phase detector, the second detector and the NCO, for generating a calibration signal according to the first phase difference and the second phase difference; wherein, the NCO adaptively adjusts the phase of the second horizontal synchronization signal according to the calibration signal.

The invention further discloses a multi-slicing horizontal synchronization signal generating method comprising steps of performing edge detection on a video signal having a first horizontal synchronization, so as to generate a first detection signal and a second detection signal according to a first voltage level and a second voltage level, respectively; generating a second horizontal synchronization signal; detecting a first phase difference between the first detection signal and the second horizontal synchronization signal; detecting a second phase difference between the second detection signal and a reference time point; generating a calibration signal according to the first phase difference and the second phase difference; and adaptively adjusting the phase of the second horizontal synchronization signal according to the calibration signal.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 4:
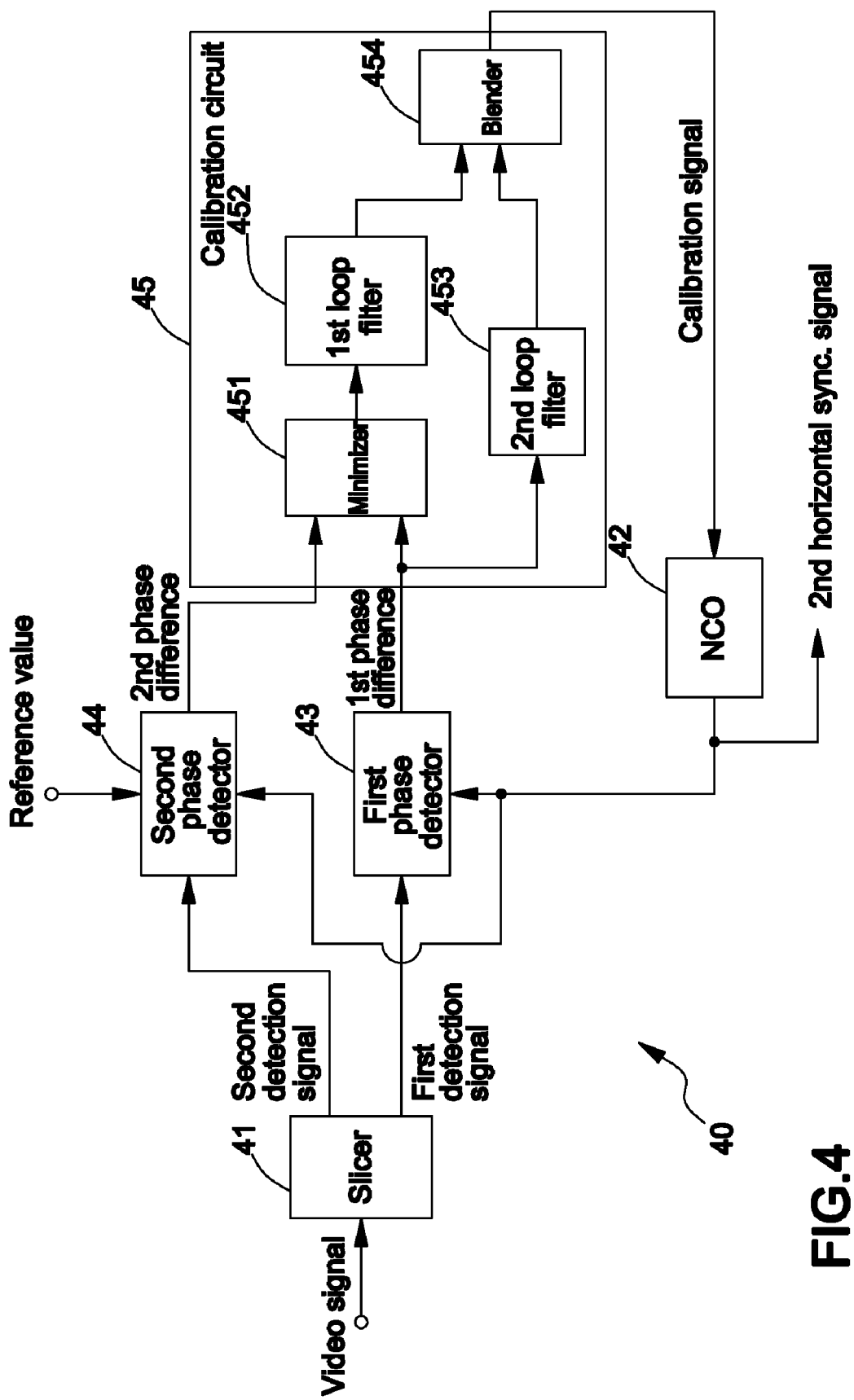
FIG. 4 shows a block diagram of a multi-slicing horizontal synchronization signal generating apparatus according to one embodiment of the invention.

FIG. 4 shows a block diagram of a multi-slicing horizontal synchronization signal generating apparatus 40 according to one preferred embodiment of the invention, comprising a slicer 41, a numerically controlled oscillator (NCO) 42, a first phase detector 43, a second phase detector 44, and a calibration circuit 45. The slicer 41 performs edge detection on a video signal having a first horizontal synchronization signal, and generates a first detection signal and a second detection signal according to a first voltage level and a second voltage level, respectively. The video signal may be a CVBS signal, a luminance signal in a Y/C signal, or a luma signal in a YPbPr signal. In this embodiment, according to the first voltage level and the second voltage level, the slicer 41 performs falling edge detection on the video signal. That is, when the slicer 41 detects a voltage value of the video signal crossing the first voltage level (or the second voltage level) from high to low, the first detection signal (or the second detection signal) is asserted to indicate a falling edge of the first horizontal synchronization signal is detected. Alternatively, the slicer 41 performs falling edge detection on the video signal according to the first voltage level, and performs rising edge detection on the video signal according to the second voltage level. Therefore, when the slicer 41 detects the voltage value of the video signal crossing the second voltage level from low to high, the second detection signal is asserted to indicate a rising edge of the first horizontal synchronization signal is detected.

Figure 5:
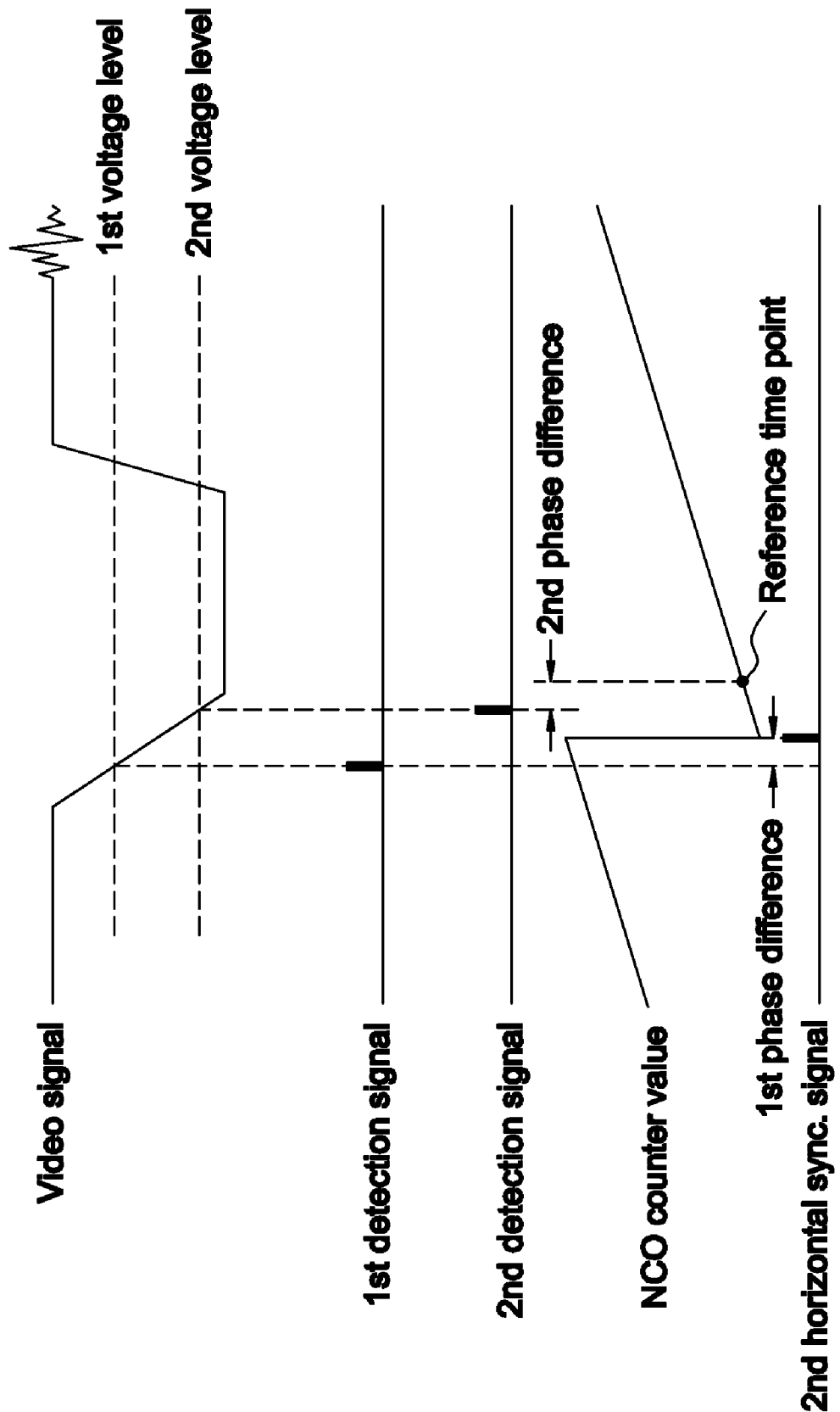
FIG. 5 shows a schematic diagram for generating the horizontal synchronization signal.

The NCO 42 generates a second horizontal synchronization signal. The first phase detector 43 is coupled to the slicer 41 and the NCO 42, and is for detecting a first phase difference between the first detection signal and the second horizontal synchronization signal. The second phase detector 44 is coupled to the slicer 41 and the NCO 42, and is for detecting a second phase difference between the second detection signal and a reference time point, wherein the reference time point corresponds to a reference value reached by an NCO counter value of the NCO 42. Upon receiving a pulse of the second detection signal, the second phase detector 44 checks and compares the NCO counter value of the NCO 42 with the reference value to obtain the second phase difference. FIG. 5 illustrates relations between the signals in FIG. 4.

Referring to FIG. 4, the calibration circuit 45 is coupled to the first phase detector 43, the second phase detector 44 and the NCO 42. Based on the first phase difference and the second phase difference, the calibration circuit 45 generates a calibration signal for the NCO 42 to adjust the phase of the second horizontal synchronization signal, such that the second horizontal synchronization signal is able to not only track and lock the first horizontal synchronization signal in the video signal, but also maintain stability thereof. The calibration circuit 45 comprises a minimizer 451, a first loop filter 452, a second loop filter 453 and a blender 454. The minimizer 451 compares the first phase difference and the second difference to output the smaller of the two. The first loop filter 452 and the second loop filter 453 perform loop-filtering on the output from the minimizer 451 and the first phase difference, respectively. The blender 454 performs blending algorithm such as alpha ($\alpha$) blending on outputs of the first loop filter 452 and the second loop filter 453 to generate the calibration signal. Alternatively, the blender 454 may be an adder.

In the event that the second phase difference is very small as approaching to zero, and persistently stays smaller than the first phase difference, the minimizer 451 will keep choosing the second phase difference for subsequent phase calibration. For that the second phase difference is rather too small to have any significant contribution to adjustment on the phase of the second horizontal synchronization generated by the NCO 42, calibration of the first phase difference between the second horizontal synchronization signal and the first horizontal synchronization signal in the video signal is likely to fail. In this embodiment, based on the output of the second loop filter 453 from the first phase difference passed through the loop filter, the calibration circuit 45 may also adjust the phase of the second horizontal synchronization signal, such that the second horizontal synchronization signal becomes able to track and lock the first horizontal synchronization signal. For example, the blender 454 may be an adder that adds outputs of the first loop filter 452 and the second loop filter 453 to generate the calibration signal. In addition, for example, the first loop filter 452 and the second loop filter 453 may be realized using one-level or two-level loop filters.

Figure 1:
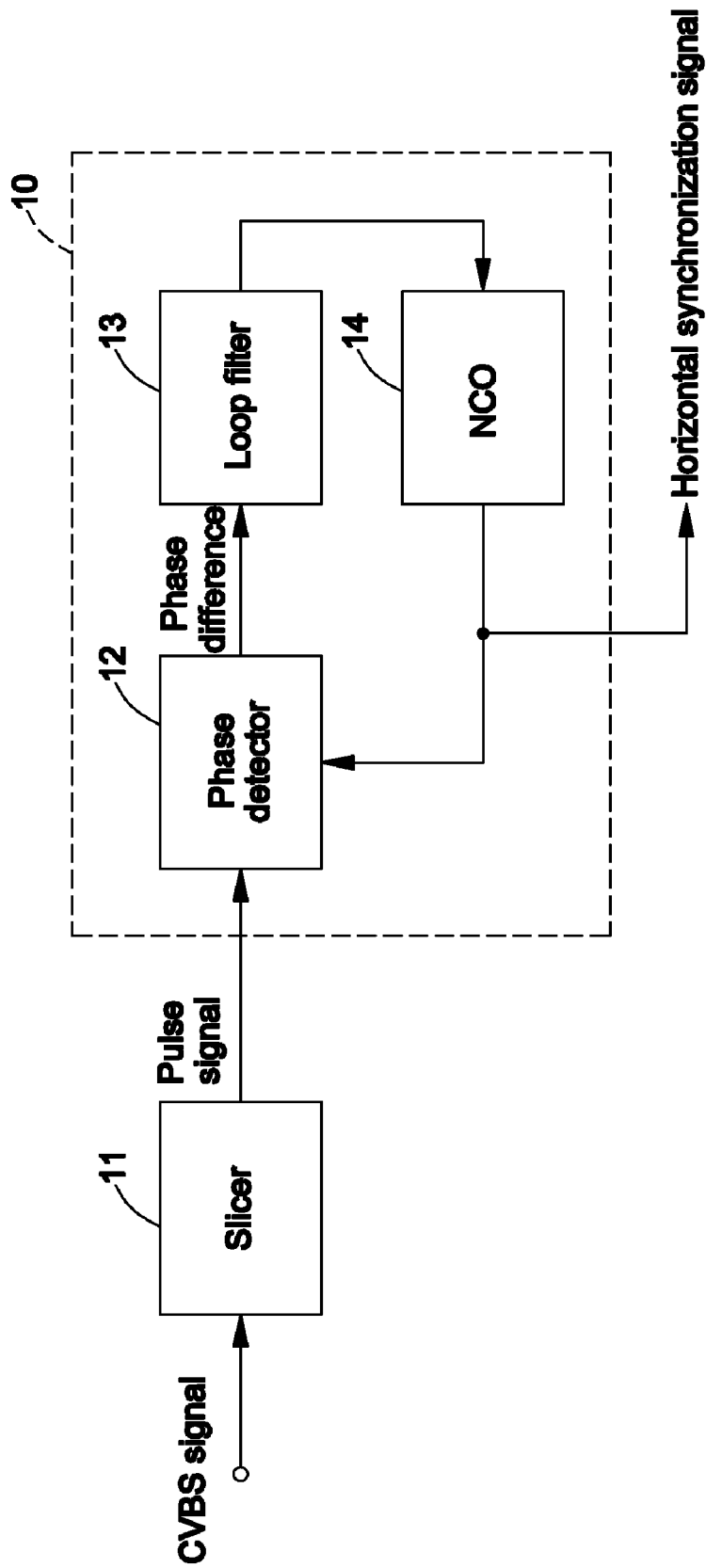
FIG. 1 shows a structure for generating a horizontal synchronization signal in a prior television.
Figure 2:
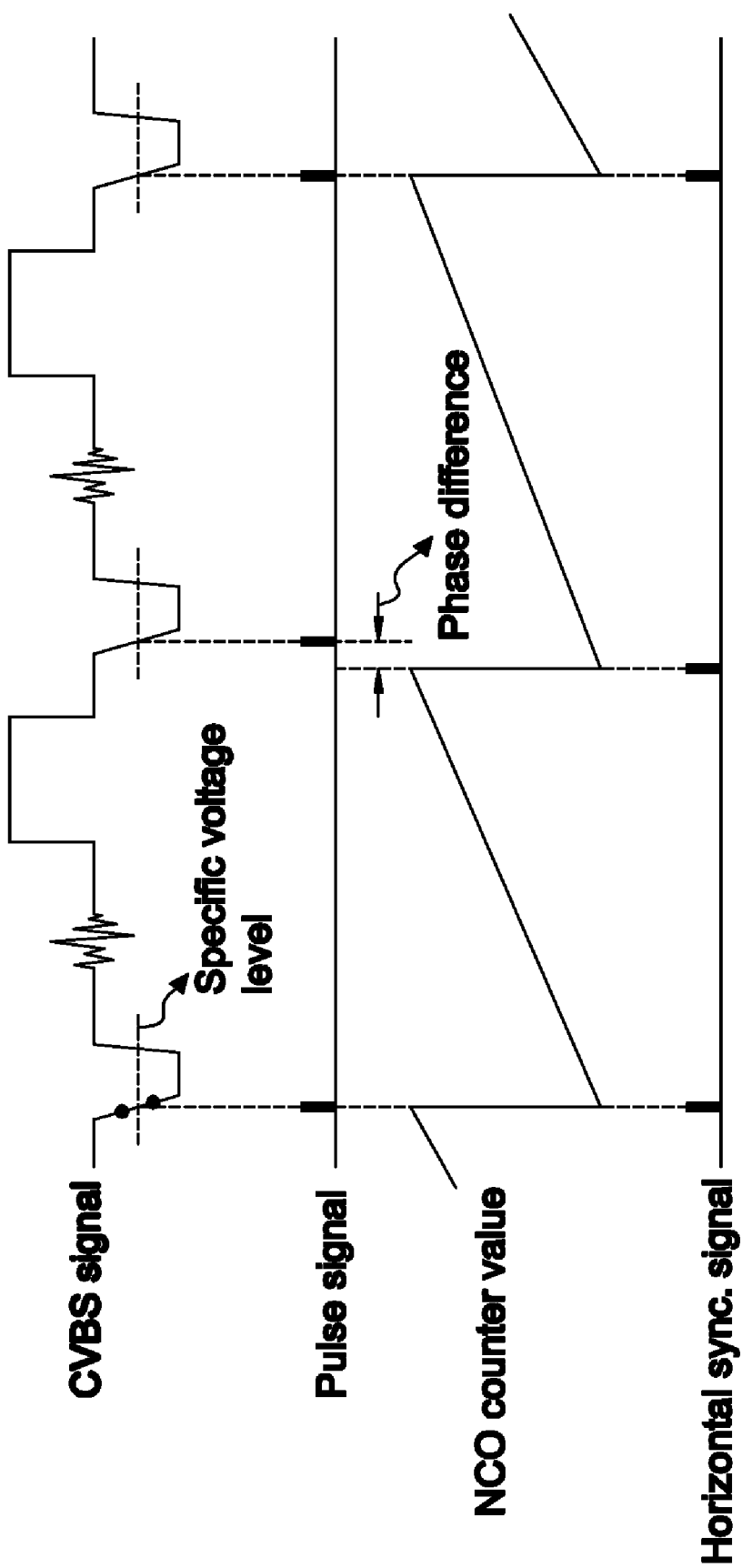
FIG. 2 is a timing diagram of the signals in the structure shown in FIG. 1.
Figure 3A:
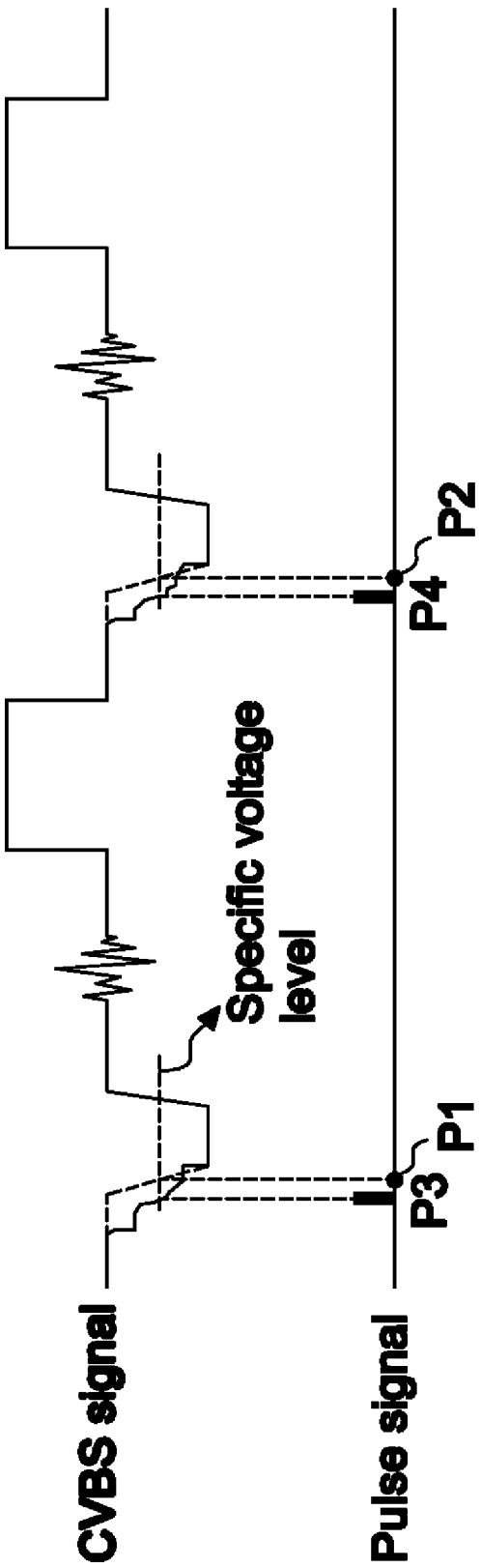
FIGS. 3A and 3B show large phase differences detected by the phase detector in FIG. 1.
Figure 3B:
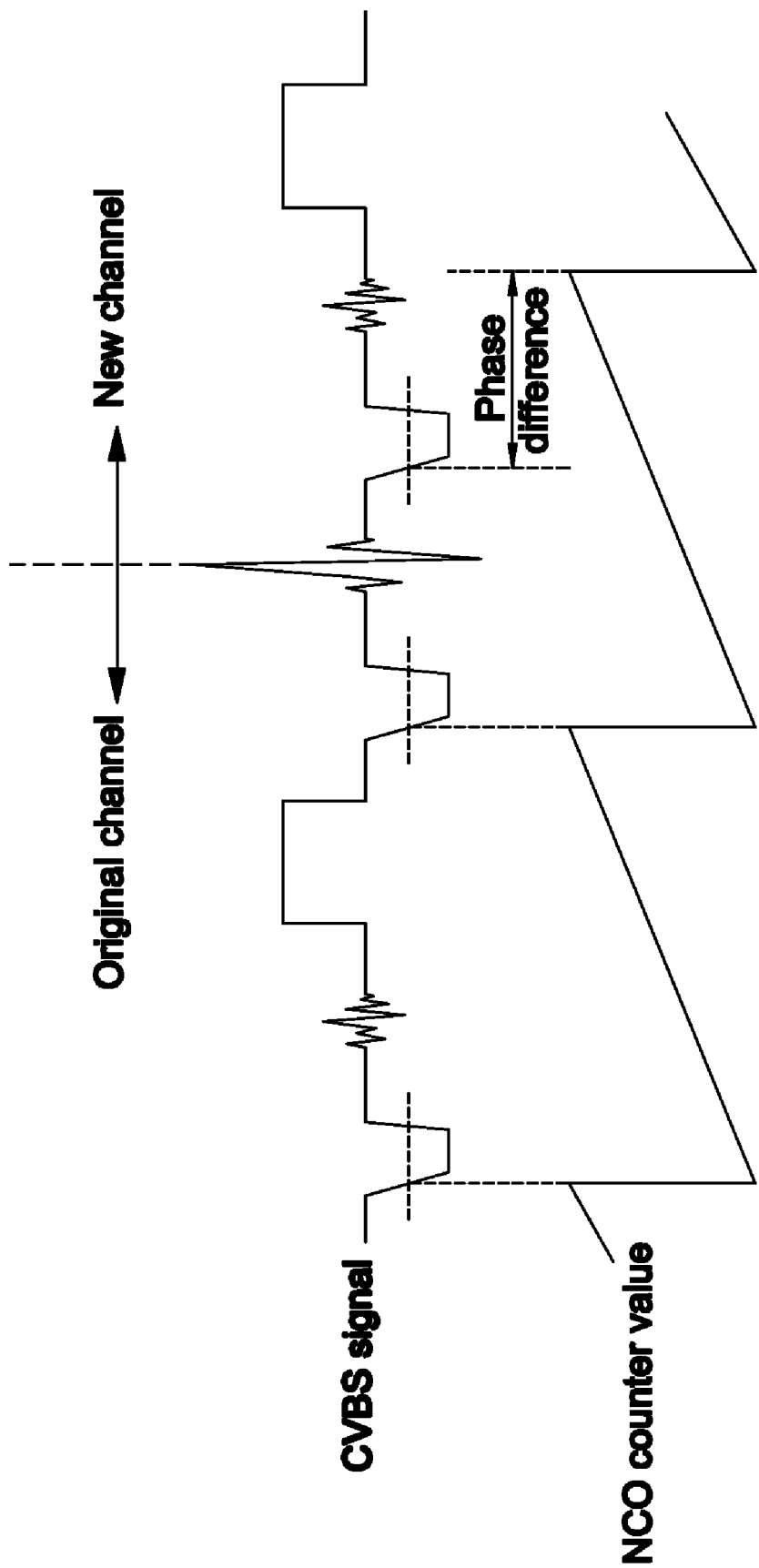
Figure 6:
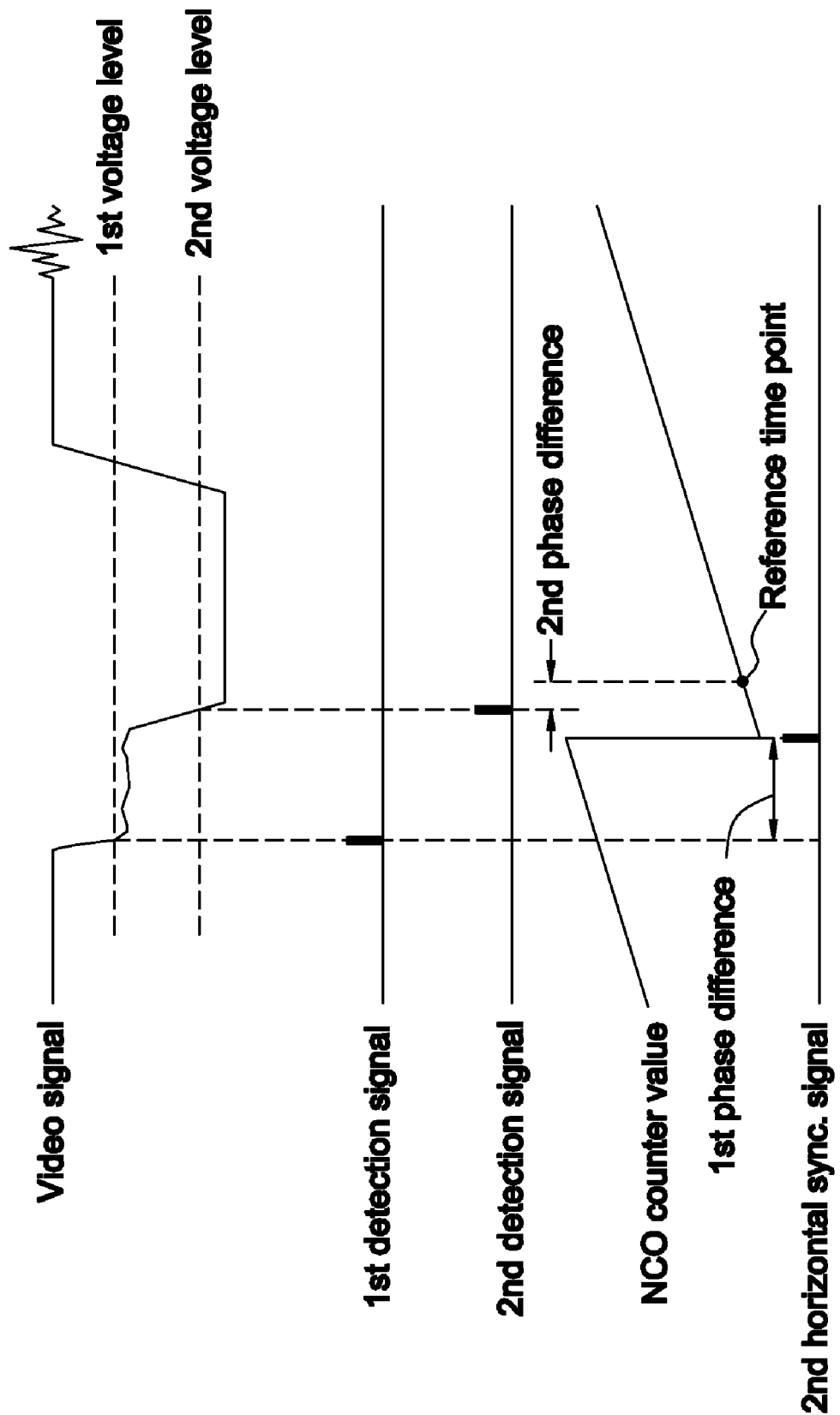
FIG. 6 shows a schematic diagram for generating the horizontal synchronization signal when the structure in FIG. 4 is applied in FIG. 3A.

The multi-slicing horizontal synchronization signal generating apparatus 40 may be applied to circumstances shown in FIGS. 3A and 3B to avoid shortcomings of prior art by adaptively calibrating the phase of the second horizontal synchronization signal. FIG. 6 shows a schematic diagram for generating the second horizontal synchronization signal when the structure in FIG. 4 is applied in FIG. 3A. Wherein, the first phase difference is quite large resulted from a large distortion at the falling edge of the first horizontal synchronization signal in the video signal. At this point, the apparatus 40 utilizes the second detection signal and the reference time point to produce a smaller second phase difference, which is utilized to generate a calibration signal for performing phase calibration by a smaller range to avoid an output picture from jittering. When the apparatus 40 is applied in the circumstances shown in FIG. 3B, due to the first phase difference and the second phase difference both being quite large, regardless of the minimizer 451 choosing either the first phase difference of the second phase difference, the calibration signal generated by the calibration circuit 45 performs phase calibration by a rather large range to avert the shortcoming of having to wait for a long while for the output picture to restore to normal when switching channels.

In another embodiment, when the second phase difference is smaller than the first phase difference, and the difference between the same is smaller than a threshold value, the minimizer 451 nevertheless chooses the first phase difference for output. That is, when an insignificant difference exists between the first phase difference and the second phase difference, the calibration circuit 45 still generates the calibration signal based on the first phase difference although the second phase difference is smaller than the first phase difference. Such operation maintains steady functioning of the multi-slicing horizontal synchronization signal generating apparatus 40.

Figure 7:
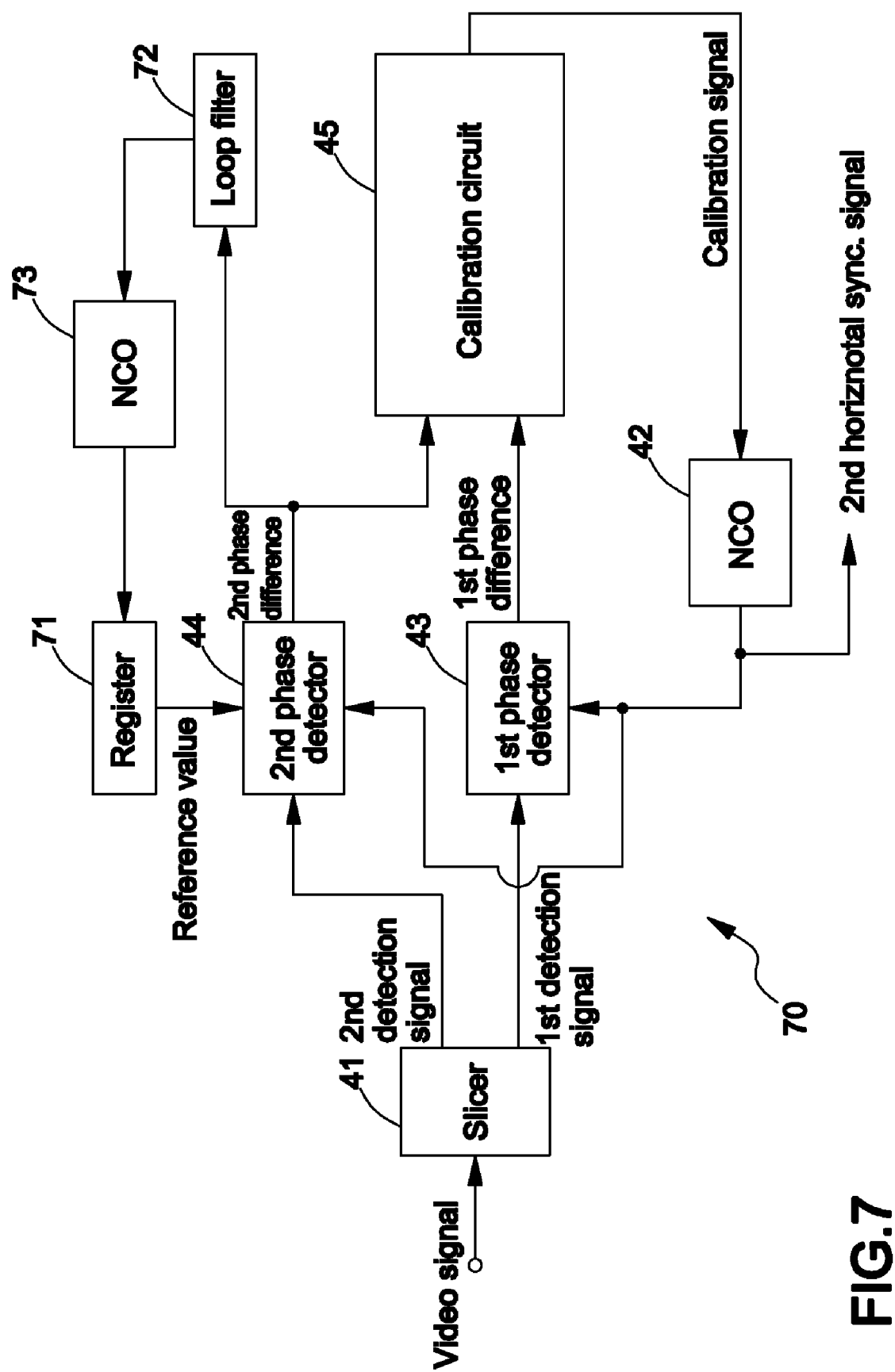
FIG. 7 shows a block diagram of a multi-slicing horizontal synchronization signal generating apparatus according to another embodiment of the invention.

FIG. 7 is a block diagram of a multi-slicing horizontal synchronization signal generating apparatus 70 according to another preferred embodiment of the invention. Compared to FIG. 4, the apparatus 70 further comprises a register 71, a loop filter 72 and an NCO 73. The register 71 stores the aforesaid reference value for use of the second phase detector 44. The loop filter 72 and the NCO 73 calibrate the reference value in the register 71 according to the second phase difference output by the second phase detector 44.

In the structures shown in FIG. 4 and FIG. 7, the slicer 41 operates according to two voltage levels. According to the foregoing disclosure, it is apparent to those skilled in related art the invention is also applicable in conditions having at least two voltage levels. Take the structure in FIG. 4 for instance, the slicer 41 performs falling edge detections on the video signal according to the first voltage level to generate the first detection signal, and performs falling edge detection or rising edge detection on the video signal according to a plurality of second voltage levels to generate a plurality of second detection signals. Each of a plurality of second phase detectors 44 is used to detect the second phase difference between one of the second detection signals and one of a plurality of reference time points, whereas the first phase detector 43 still detects the first phase difference between the first detection signal and the second horizontal synchronization signal. The first phase difference and the plurality of second phase differences are forwarded to the calibration circuit 45. The minimizer 453, from the first phase difference and the plurality of second phase differences, chooses the smallest for subsequent phase calibration of the second horizontal synchronization signal. According to the first phase difference and the plurality of second phase differences, the calibration circuit 45 enables the multi-slicing horizontal synchronization signal generating apparatus 70 to adaptively adjust the phase of the second horizontal synchronization signal.

Figure 8:
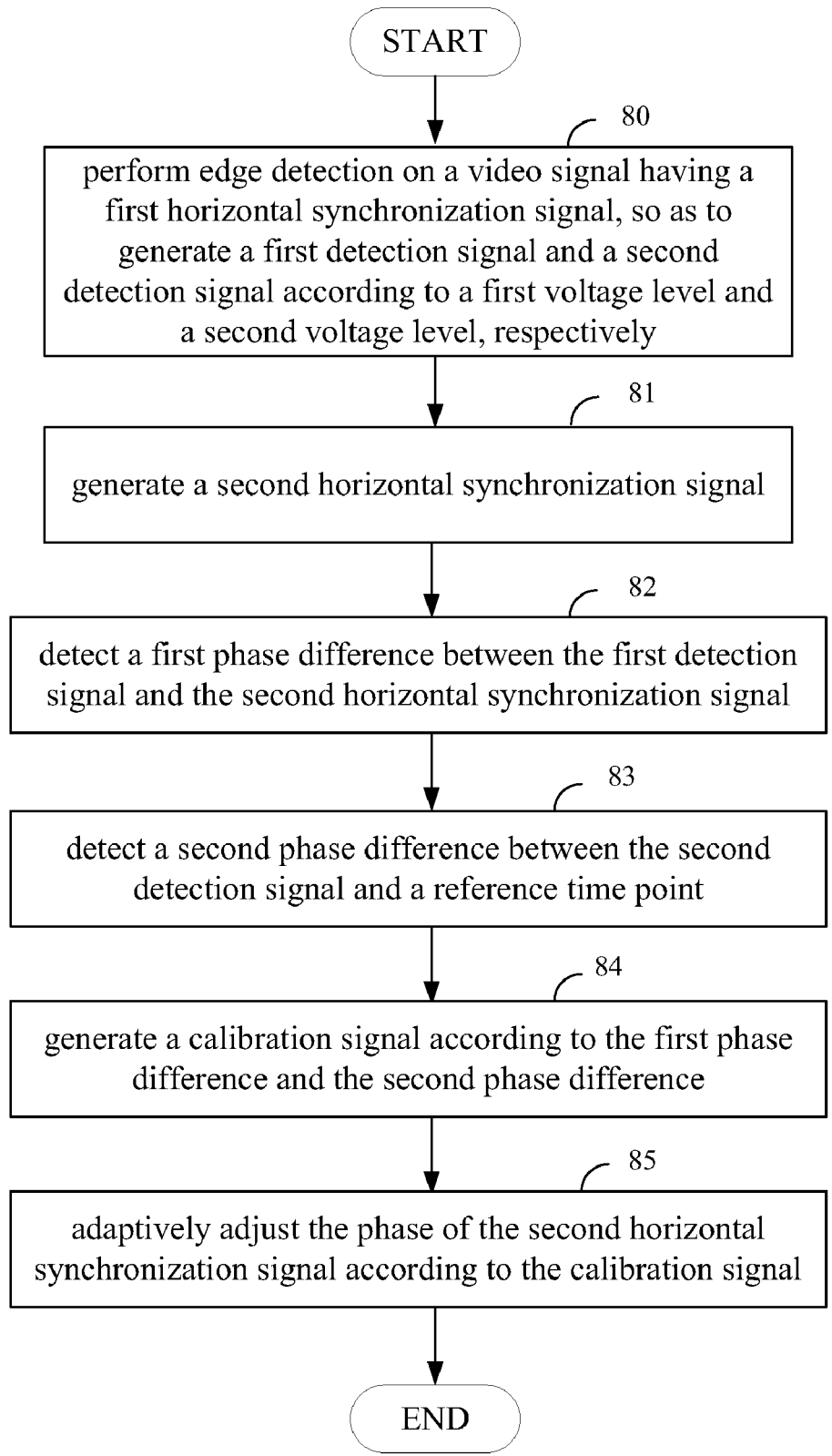
FIG. 8 shows a flow chart of a multi-slicing horizontal synchronization signal generating method according to one embodiment of the invention.

FIG. 8 shows a flow chart of a multi-slicing horizontal synchronization signal generating method according to one embodiment of the invention. At step 80, performs edge detection on a video signal having a first horizontal synchronization signal, so as to generate a first detection signal and a second detection signal according to a first voltage level and a second voltage level, respectively. At step 81, generates a second horizontal synchronization signal. At step 82, detects a first phase difference between the first detection signal and the second horizontal synchronization signal. At step 83, detects a second phase difference between the second detection signal and a reference time point. At step 84, generates a calibration signal according to the first phase difference and the second phase difference. At step 85, adaptively adjusts the phase of the second horizontal synchronization signal according to the calibration signal.

In this embodiment, the step 80 performs falling edge detection on the video signal to generate the first detection signal and the second detection signal according to the first voltage level and the second voltage level, respectively. In another embodiment, the step 80 performs falling edge detection on the video signal to generate the first detection signal according to the first voltage level, and performs rising edge detection on the video signal to generate the second detection signal according to the second voltage level.

In the step 81, the second horizontal synchronization signal may be generated using an NCO. In the step 83, the reference time point corresponds to a reference value reached by an NCO counter value of the NCO. Preferably, the reference value can be calibrated according to the second phase difference.

In this embodiment, the step 84 performs loop filtering on both the smaller of the first phase difference and the second phase difference, and the first phase difference. The two loop-filtered outputs are applied with blending algorithm to generate the calibration signal. Alternatively, when the second phase difference is smaller than the first phase difference, and the difference between the same is smaller than a threshold value, the step 84 does not apply loop filter on the second phase difference, which is the smaller one, but still applies loop filter on the first phase difference to generate the calibration signal.

While the invention has been described in terms of what is presently considered to be the most practical and preferred embodiments, it is to be understood that the invention need not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A multi-slicing horizontal synchronization signal generating apparatus, comprising:
   a slicer, performing edge detection on a video signal having a first horizontal synchronization, so as to generate a first detection signal and a second detection signal according to a first voltage level and a second voltage level, respectively;
   a numerically controlled oscillator (NCO), for generating a second horizontal synchronization signal;
   a first phase detector, coupled to the slicer and the NCO, for detecting a first phase difference between the first detection signal and the second horizontal synchronization signal;
   a second phase detector, coupled to the slicer and the NCO, for detecting a second phase difference between the second detection signal and a reference time point corresponding to a reference value reached by an NCO counter value of the NCO; and
   a calibration circuit, coupled to the first phase detector, the second phase detector and the NCO, for generating a calibration signal according to the first phase difference and the second phase difference;
   wherein, the NCO adaptively adjusts a phase of the second horizontal synchronization signal according to the calibration signal.

2. The apparatus according to claim 1, wherein the video signal is a CVBS signal, a luminance signal in a Y/C signal, or a luma signal in a YPbPr signal.

3. The apparatus according to claim 1, wherein the slicer performs falling edge detection on the video signal according to the first voltage level and the second voltage level.

4. The apparatus according to claim 1, wherein the slicer performs falling edge detection on the video signal according to the first voltage level, and performs rising edge detection on the video signal according to the second voltage level.

5. The apparatus according to claim 1, further comprising a register for storing the reference value.

6. The apparatus according to claim 5, further comprising a loop filter, and another NCO for calibrating the reference value in the register according to the second phase difference.

7. The apparatus according to claim 1, wherein the calibration circuit generates the calibration signal according to the smaller of the first phase difference and the second phase difference.

8. The apparatus according to claim 1, wherein when the second phase difference is smaller than the first phase difference and smaller than a threshold value, the calibration circuit generates the calibration signal according to the first phase difference.

9. The apparatus according to claim 1, wherein the calibration circuit comprises:
a minimizer, coupled to the first phase detector and the second detector, for comparing the first phase difference and the second phase difference to output the smaller of the two;
a first loop filter, for performing loop filtering on the output from the minimizer;
a second loop filter, coupled to the first phase detector, for performing loop filtering on the first phase difference; and
a blender, for blending the outputs from the first loop filter and the second loop filter.

10. The apparatus according to claim 9, wherein the blender is an adder.

11. A multi-slicing horizontal synchronization signal generating method, comprising steps of:
performing edge detection on a video signal having a first horizontal synchronization signal, so as to generate a first detection signal and a second detection signal according to a first voltage level and a second voltage level, respectively;
generating a second horizontal synchronization signal by an NCO;
detecting a first phase difference between the first detection signal and the second horizontal synchronization signal;
detecting a second phase difference between the second detection signal and a reference time point corresponding to a reference value reached by an NCO counter value of the NCO;
generating a calibration signal according to the first phase difference and the second phase difference; and
adaptively adjusting the phase of the second horizontal synchronization signal according to the calibration signal.

12. The method according to claim 11, wherein the video signal is a CVBS signal, a luminance signal in a Y/C signal, or a luma signal in a YPbPr signal.

13. The method according to claim 11, wherein the first detection signal and the second detection signal are generated by performing falling edge detection on the video signal according to the first voltage level and the second voltage level, respectively.

14. The method according to claim 11, wherein the first detection signal is generated by performing falling edge detection on the video signal according to the first voltage level, and the second detection signal is generated by performing rising edge detection on the video signal according to the second voltage level.

15. The method according to claim 11, further comprising a step of calibrating the reference value according to the second phase difference.

16. The method according to claim 11, wherein the calibration signal is generated according to the smaller of the first phase difference and the second phase difference.

17. The method according to claim 11, wherein when the second phase difference is smaller than the first phase difference, and a difference between the same is smaller than a threshold value, the calibration signal is generated based on the first phase difference.

* * * * *